(12) United States Patent
Tomokage et al.

(10) Patent No.: US 10,457,133 B2
(45) Date of Patent: Oct. 29, 2019

(54) VEHICLE AND DRIVE CIRCUIT UNIT

(71) Applicant: HONDA MOTOR CO., LTD., Minato-ku, Tokyo (JP)

(72) Inventors: Ryoji Tomokage, Wako (JP); Masahiro Shimada, Wako (JP); Seiichi Goto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/029,740

(22) Filed: Jul. 9, 2018

(65) Prior Publication Data

US 2019/0016208 A1     Jan. 17, 2019

(30) Foreign Application Priority Data

Jul. 13, 2017   (JP) ................................ 2017-137268

(51) Int. Cl.

| | |
|---|---|
| B60L 11/02 | (2006.01) |
| B61C 9/38 | (2006.01) |
| B60K 6/405 | (2007.10) |
| H02K 7/00 | (2006.01) |
| H02K 11/00 | (2016.01) |
| H02K 5/22 | (2006.01) |
| H02K 11/33 | (2016.01) |

(52) U.S. Cl.
CPC ............ *B60K 6/405* (2013.01); *H02K 5/225* (2013.01); *H02K 7/006* (2013.01); *H02K 11/0094* (2013.01); *H02K 11/33* (2016.01); *B60Y 2200/92* (2013.01); *H02K 2211/03* (2013.01)

(58) Field of Classification Search
CPC ........ H02K 11/33; H02K 5/225; H02K 7/006; H02K 11/0094; B60K 6/405
See application file for complete search history.

(56) References Cited

U.S. PATENT DOCUMENTS

| | | | |
|---|---|---|---|
| 7,079,379 | B2 | 7/2006 | Yamaguchi et al. |
| 8,893,843 | B2 | 11/2014 | Hayano |
| 9,210,829 | B2 | 12/2015 | Hotta et al. |

(Continued)

FOREIGN PATENT DOCUMENTS

| | | |
|---|---|---|
| JP | 2005-178732 | 7/2005 |
| JP | 2012-101569 | 5/2012 |

(Continued)

OTHER PUBLICATIONS

Japanese Office Action for Japanese Patent Application No. 2017-137268 dated Dec. 11, 2018.

*Primary Examiner* — Tulsidas C Patel
*Assistant Examiner* — Thomas K Quigley
(74) *Attorney, Agent, or Firm* — Amin, Turocy & Watson LLP

(57) ABSTRACT

In a drive circuit unit of a vehicle, a first terminal is electrically connected to a drive circuit that performs power conversion, and configured to input or output electric power with respect to the exterior of the drive circuit unit via a first cable. A front protruding portion is formed by extending a portion of a front side surface of the drive circuit unit in a forward direction in a longitudinal direction of the vehicle. The first terminal is disposed on the front protruding portion in an upwardly facing manner, at a more rearward position than a front end of the front protruding portion.

9 Claims, 5 Drawing Sheets

(56) References Cited

U.S. PATENT DOCUMENTS

| | | | |
|---|---|---|---|
| 10,027,143 B2 | 7/2018 | Shiba | |
| 2005/0205316 A1* | 9/2005 | Yamafuji | B60L 3/0007 |
| | | | 180/68.5 |
| 2014/0151138 A1* | 6/2014 | Kitami | B60L 3/04 |
| | | | 180/65.21 |
| 2014/0333130 A1 | 11/2014 | Matano et al. | |
| 2017/0136869 A1* | 5/2017 | Ziefle | B60K 6/387 |
| 2018/0022202 A1* | 1/2018 | Urabe | B60K 1/02 |
| | | | 180/65.26 |
| 2018/0281605 A1* | 10/2018 | Sawazaki | B60L 50/51 |

FOREIGN PATENT DOCUMENTS

| | | |
|---|---|---|
| JP | 2012-144227 | 8/2012 |
| JP | 2012-240477 | 12/2012 |
| JP | 2013-198350 | 9/2013 |
| JP | 2014-076685 | 5/2014 |
| JP | 2017-019460 | 1/2017 |
| JP | 2017-216334 | 12/2017 |
| WO | 2012/105353 | 8/2012 |

\* cited by examiner

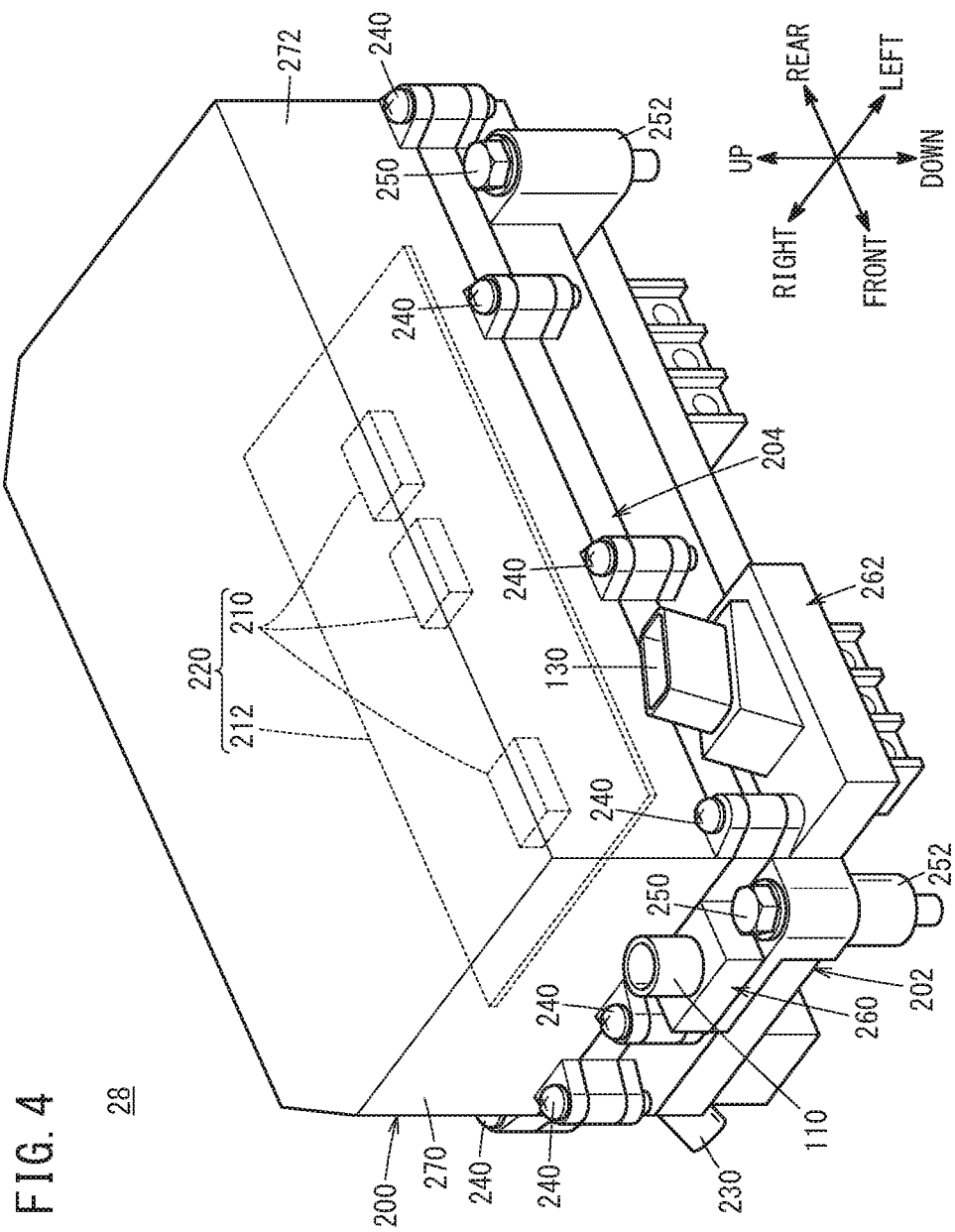

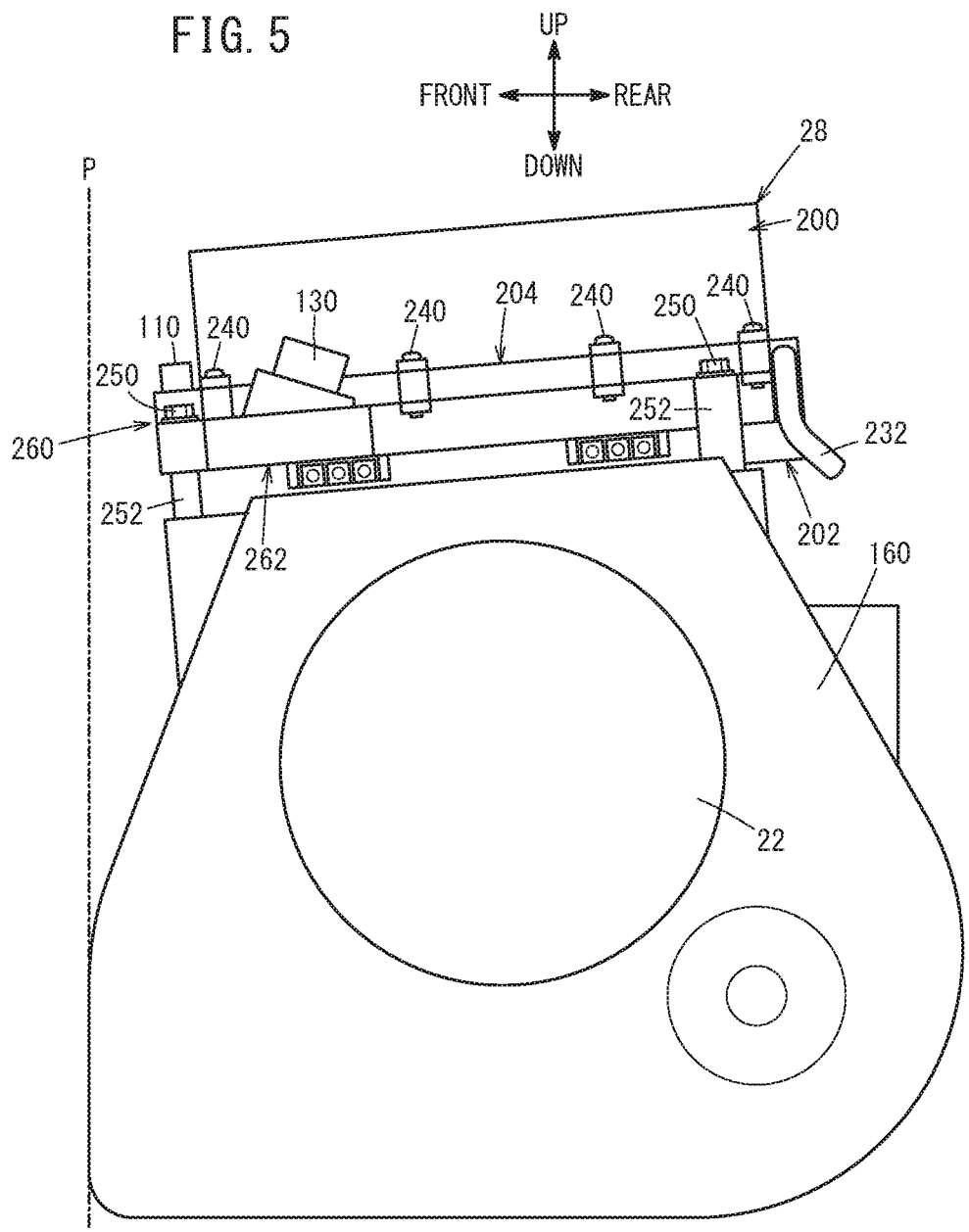

VEHICLE AND DRIVE CIRCUIT UNIT

CROSS-REFERENCE TO RELATED APPLICATION

This application is based upon and claims the benefit of priority from Japanese Patent Application No. 2017-137268 filed on Jul. 13, 2017, the contents of which are incorporated herein by reference.

BACKGROUND OF THE INVENTION

Field of the Invention

The present invention relates to a drive circuit unit equipped with a drive circuit that converts (or adjusts) an electric power from a power source and supplies the converted or adjusted electric power to a motor, as well as to a vehicle having such a drive circuit unit.

Description of the Related Art

Various connecting structures for electrically connecting with the exterior have been proposed or disclosed in relation to a drive circuit unit that converts (or adjusts) electric power from a power source and supplies the converted or adjusted electric power to a motor (for example, see Japanese Laid-Open Patent Publication No. 2012-240477).

Japanese Laid-Open Patent Publication No. 2012-240477 has the object of providing a charge-discharge harness routing structure in an electric vehicle, which is capable of enhancing a protective property of the charge-discharge harness when an external force is input to the electric vehicle (paragraph [0005], abstract). In order to achieve this object, according to Japanese Laid-Open Patent Publication No. 2012-240477 (abstract), a high-power unit 20, which is disposed in a motor room and supplies a drive current to a motor drive unit 10, and a battery pack, which is disposed in a lower part of the vehicle body floor, are connected to each other through the charge-discharge harness 51. The high-power unit 20 includes a unit rear surface (a rear surface of the high-power module) 24, and a harness connecting recessed part 25. The unit rear surface 24 faces toward a dash panel upright extending between the motor room and the vehicle body floor. The harness connecting recessed part 25 is recessed from the unit rear surface 24 toward the interior of the high-power unit 20, and a charge-discharge harness connecting terminal 26, which is connected to one end 51a of the charge-discharge harness 51, is provided inside the harness connecting recessed part 25.

According to a first embodiment of Japanese Laid-Open Patent Publication No. 2012-240477, the charge-discharge harness 51 and a charging harness 52 (including a rapid charge harness 53 and a normal charge harness 54) are connected to the connecting terminals 26, 27a, 27b that are provided in the harness connecting recessed part 25 (see FIGS. 2, 3, 4 and paragraphs [0022] to [0025]). Further, the harness connecting recessed part 25 is positioned below the dash panel 4 (see FIG. 3 and paragraph [0028]).

SUMMARY OF THE INVENTION

As described above, in Japanese Laid-Open Patent Publication No. 2012-240477, inside the harness connecting recessed part 25, which is recessed toward the interior of the high-power unit 20 (drive circuit unit) from the unit rear surface 24, harnesses 51, 53, 54 (or cables) are connected to the respective connecting terminals 26, 27a, 27b (see FIGS. 2, 3, 4 and paragraphs [0022] to [0025]).

However, in the case that the connecting terminals 26, 27a, 27b are arranged inside the harness connecting recessed part 25, in a state in which the high-power unit 20 is disposed inside the motor room 2, time and effort is required for an operator to attach and detach the harnesses 51, 53, 54 with respect to the connecting terminals 26, 27a, 27b. In particular, in the event that the harness connecting recessed part 25 is positioned below the dash panel 4 (see FIG. 3), in a state with the bonnet opened, it is difficult to see the connecting terminals 26, 27a, 27b from above the high-power unit 20.

The present invention has been devised taking into consideration the aforementioned problems, and has the object of providing a vehicle and a drive circuit unit, which are capable of improving ease of operation when attaching or detaching cables with respect to terminals of the drive circuit unit.

A vehicle according to one aspect of the present invention includes:

a motor;
a power source; and
a drive circuit unit configured to convert electric power from the power source and supply the converted electric power to the motor;
the drive circuit unit including:
a drive circuit configured to perform power conversion;
a first terminal electrically connected to the drive circuit, and which is configured to input or output electric power with respect to the exterior of the drive circuit unit via a first cable; and
a front protruding portion formed by extending a portion of a front side surface of the drive circuit unit in a forward direction in a longitudinal direction of the vehicle;
wherein the first terminal is disposed on the front protruding portion in an upwardly facing manner, at a more rearward position than a front end of the front protruding portion.

According to the present invention, the first terminal is disposed in an upwardly facing manner. Therefore, for example, in a state in which the bonnet is opened, an operator can easily see the first terminal. In addition, the first terminal is disposed on the front protruding portion that is formed by extending a portion of the front side surface of the drive circuit unit in a forward direction. Therefore, for example, compared to a case in which the first terminal is disposed behind or to one side of the drive circuit unit, it is possible to shorten the distance between the operator and the first terminal. Accordingly, it is possible to improve ease of operation when attaching or detaching the first cable, at a time of assembling the vehicle or when performing maintenance or the like.

Further, according to the present invention, the first terminal is disposed on the front protruding portion at a more rearward position than the front end of the front protruding portion. Therefore, in the case that a peripheral component (front side peripheral component), which is arranged more on a front side than the drive circuit unit, presses against the drive circuit unit when the vehicle collides with a forward obstacle, the pressing force (load) from the front side peripheral component is received by the front end of the front protruding portion. Accordingly, by preventing the load from being directly input to the first terminal, it is possible to protect the first terminal.

The drive circuit unit may further include a case in which the drive circuit is accommodated, and a heat sink which is fixed to the case and arranged along the longitudinal direction of the vehicle. Further, the front protruding portion may be configured as a portion of the heat sink that is positioned in front of the case.

In accordance with these features, the first terminal is disposed on the front protruding portion, which forms a portion of the heat sink that is positioned in front of the case. Because the heat sink is fixed to the case, it is easy to arrange the first terminal in the vicinity of the case. Further, in the case that the heat sink is of relatively high rigidity, it is possible to protect the first terminal more reliably, even when the vehicle collides with a forward obstacle, and the front side peripheral component is pressed against the heat sink.

A fastening part, in which a fastening member for fastening the drive circuit unit to a motor housing is disposed, may be formed on the front protruding portion. Further, the first terminal may be disposed at a more rearward position than the front end of the front protruding portion and to one side of the fastening part.

Since the fastening member (a bolt or the like), which is disposed in the fastening part, is fixed to the exterior, the rigidity in the vicinity of the fastening member and the fastening part tends to be high. According to the present invention, the first terminal is disposed at a more rearward position than the front end of the front protruding portion and to one side of the fastening part. Therefore, even in the case that the vehicle collides with a forward obstacle and the front side peripheral component is pressed against the front protruding portion, it is possible for the first terminal to be protected more reliably.

The drive circuit unit may further include a second terminal connected electrically to the drive circuit, and which is configured to input or output electric power with respect to the exterior of the drive circuit unit via a second cable. Further, the fastening part may be formed at an end of the front protruding portion in a vehicle widthwise direction. Furthermore, the second terminal may be disposed in an upwardly facing manner on a rear side of the fastening part.

As discussed above, the rigidity in the vicinity of the fastening part tends to be high. According to the present invention, the first terminal and the second terminal are provided in the vicinity of the fastening part. Therefore, even in the case that the vehicle collides with a forward obstacle and the front side peripheral component is pressed against the front protruding portion, it is possible for the first terminal and the second terminal to be protected more reliably.

Further, since the first terminal and the second terminal are disposed in the vicinity of the fastening part, the first terminal and the second terminal are disposed in close proximity to each other. Therefore, in the case that attachment or detachment of the first cable and the second cable are carried out at the same time, operational efficiency can be improved.

The drive circuit unit may be fixed to a motor housing in which the motor is accommodated. Further, the front end of the front protruding portion may be positioned on a more rearward side than a front end of the motor housing. In accordance with these features, in the case that the vehicle collides with a forward obstacle and the front side peripheral component is displaced toward the rear, the front side peripheral component has a higher possibility of coming into contact with the front end of the motor housing than the front end of the front protruding portion. Stated otherwise, contact of the front side peripheral component with respect to the first terminal can be prevented both by the front protruding portion and the motor housing. Accordingly, the first terminal can be protected more reliably.

The drive circuit may include a DC/DC converter configured to step down a voltage from the power source. Further, the first cable may connect an output side of the DC/DC converter to a low voltage system via the first terminal. Furthermore, the second cable may connect the second terminal and the power source to each other.

In accordance with these features, the first terminal to which a relatively low voltage is applied is disposed on a front side, whereas the second terminal to which a relatively high voltage is applied is disposed on a rear side. Accordingly, in the case that the vehicle collides with a forward obstacle and the front side peripheral component comes into contact with the front protruding portion, the second terminal can be protected preferentially over the first terminal.

The drive circuit unit may be inclined so as to be positioned at a downward orientation heading toward a front side of the vehicle. In accordance with this feature, it is possible to further improve ease of operation when the operator attaches or detaches the first cable to or from the front side of the vehicle.

The motor and the drive circuit unit may be arranged inside a motor room provided on a front side of the vehicle. Further, the motor room may be arranged between a vehicle cabin, a bonnet, and a motor frame. Consequently, it is possible to enhance the effect of the arrangement and orientation of the first terminal.

A drive circuit unit according to another aspect of the present invention serves to convert electric power from a power source and supply the converted electric power to a motor, the drive circuit unit including:

a drive circuit configured to perform power conversion;

a first terminal electrically connected to the drive circuit, and which is configured to input or output electric power with respect to the exterior of the drive circuit unit via a first cable; and a front protruding portion formed by extending a portion of a front side surface of the drive circuit unit in a forward direction;

wherein the first terminal is disposed on the front protruding portion in an upwardly facing manner, at a more rearward position than a front end of the front protruding portion.

According to the present invention, it is possible to improve ease of operation when attaching or detaching cables with respect to terminals of the drive circuit unit.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 4 is a perspective view schematically showing an external appearance of the PCU according to the embodiment of the present invention; and FIG. 5 is a side view of the PCU and the periphery thereof according to the embodiment of the present invention.

DESCRIPTION OF THE PREFERRED EMBODIMENTS

A. Embodiment

A-1. Configuration

[A-1-1. Overall Configuration]

Figure 1:
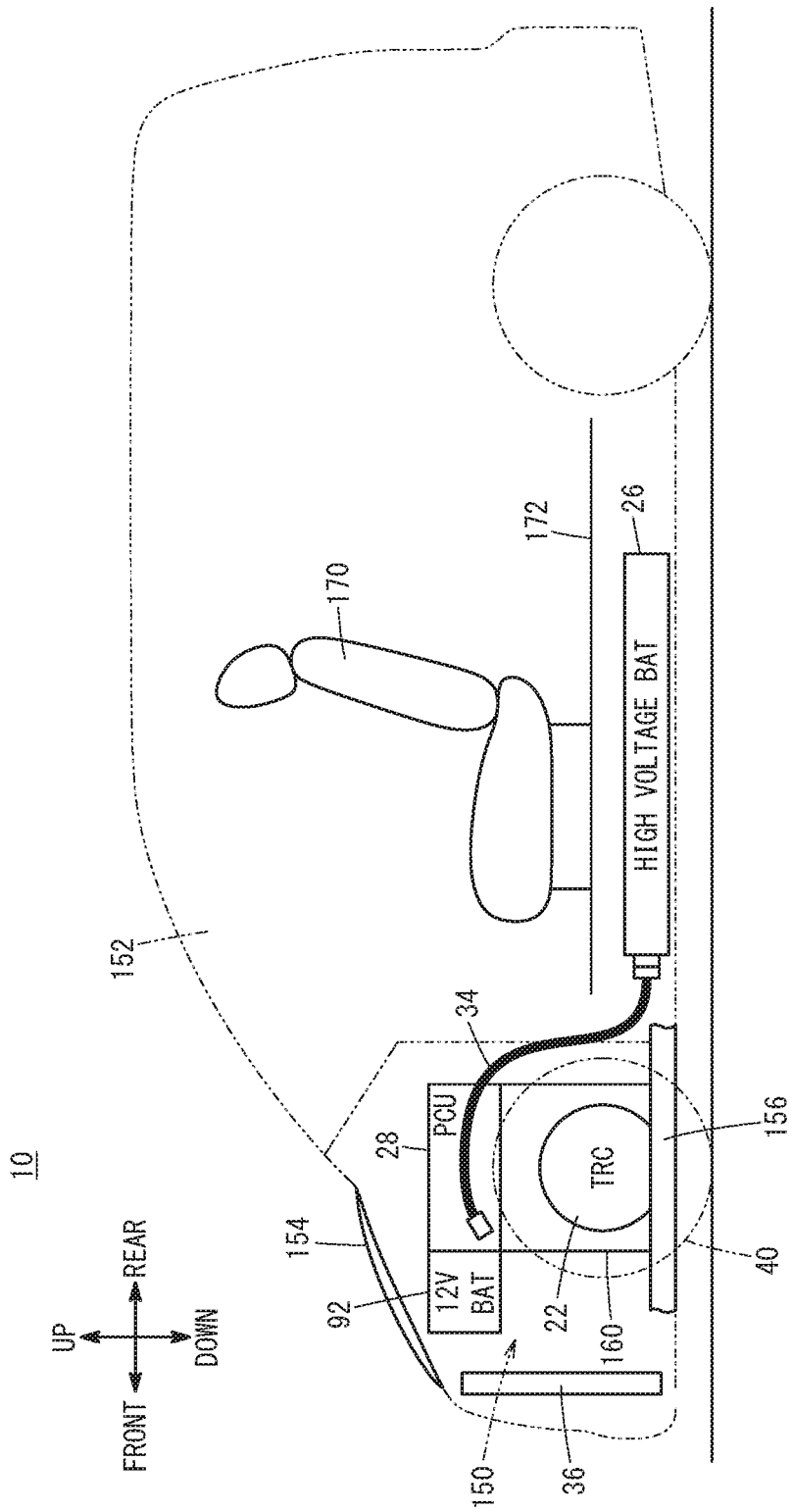
FIG. 1 is a side view schematically showing a configuration of a vehicle including an electric power control unit (hereinafter referred to as a "PCU") as a drive circuit unit according to an embodiment of the present invention.
Figure 2:
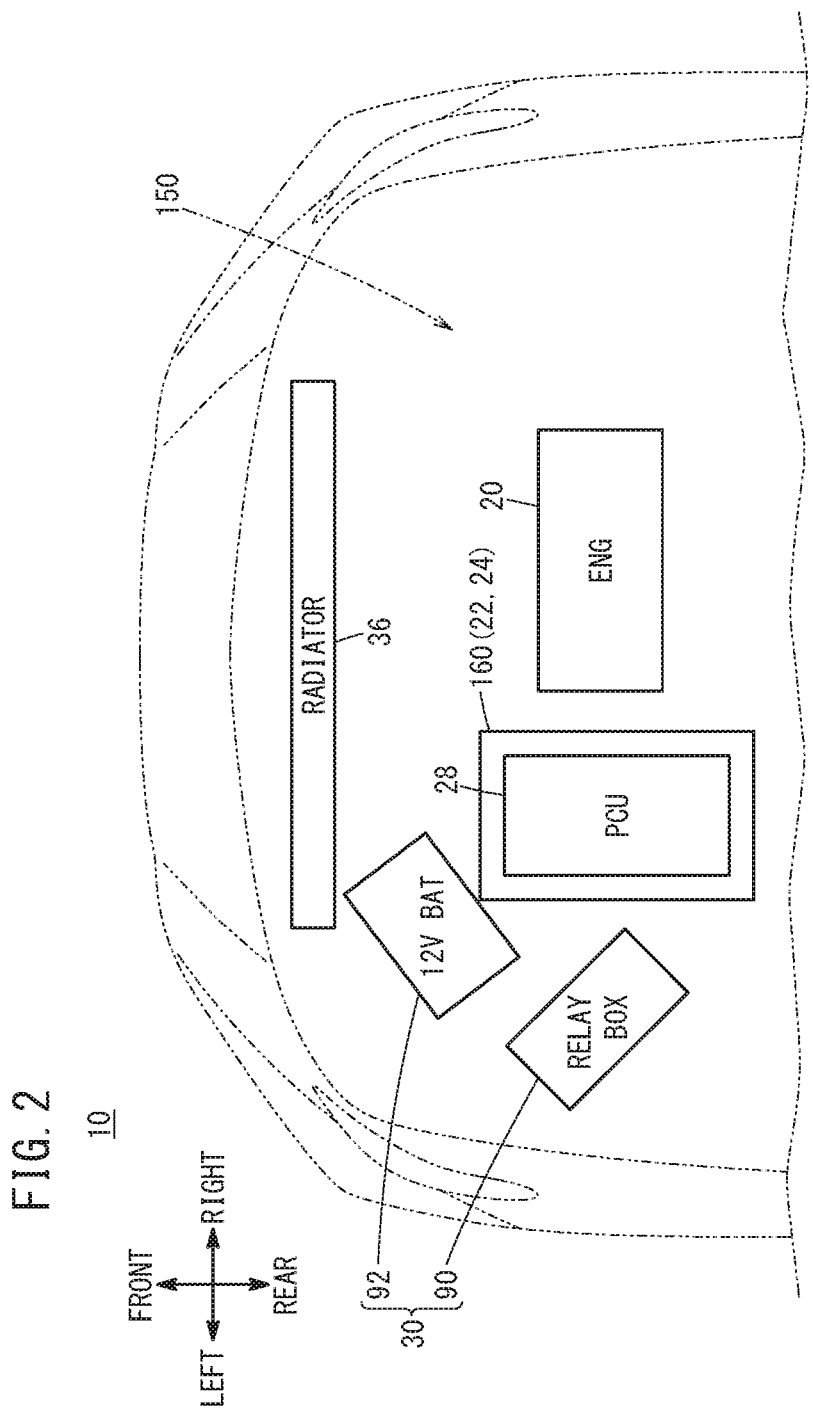
FIG. 2 is a plan view schematically showing a configuration on a front side of the vehicle according to the embodiment of the present invention.
Figure 3:
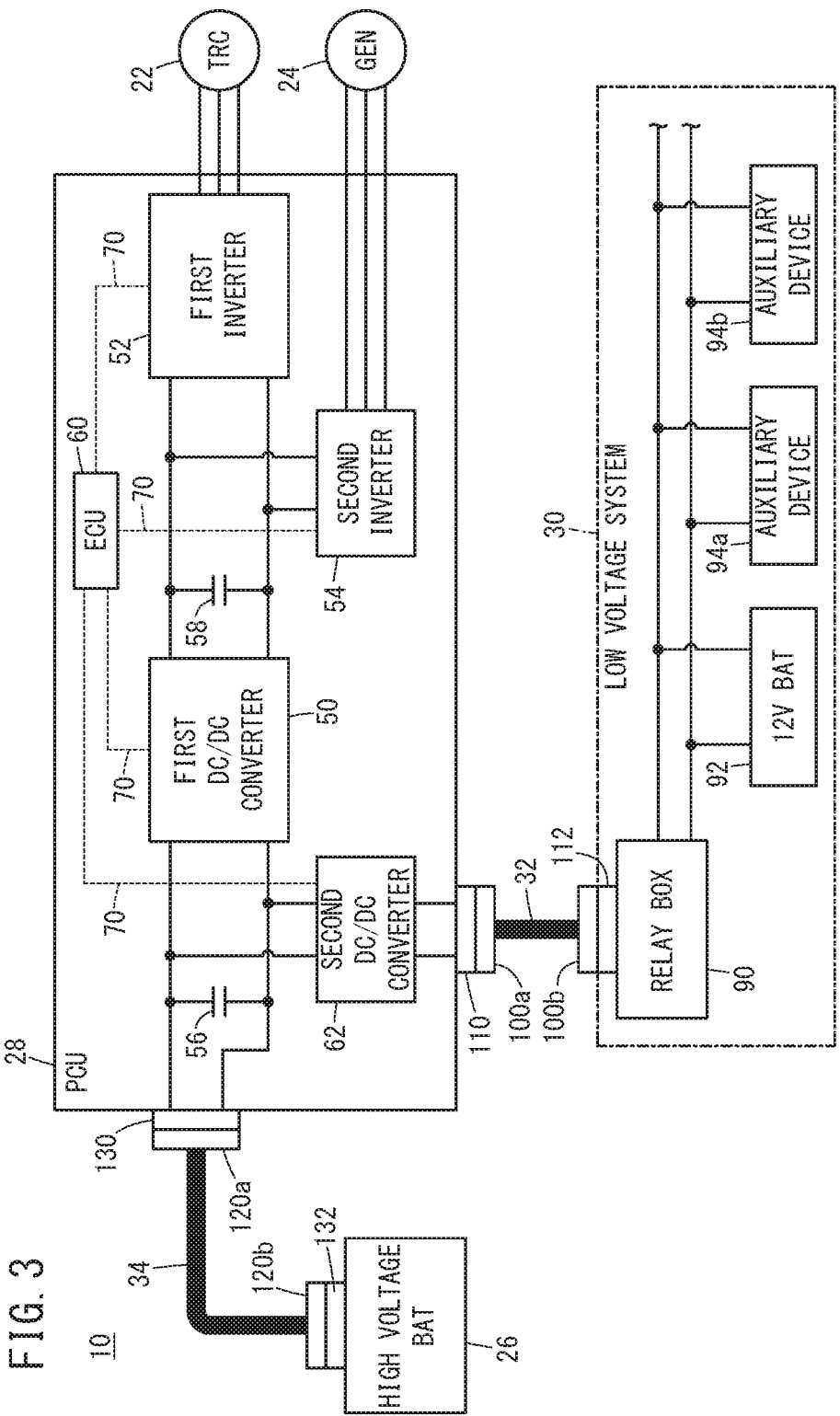
FIG. 3 is an electrical circuit diagram showing an electrical connection relation of the vehicle according to the embodiment of the present invention.

FIG. 1 is a side view schematically showing a configuration of a vehicle 10 including an electric power control unit 28 (hereinafter referred to as a "PCU 28") as a drive circuit unit according to an embodiment of the present invention. FIG. 2 is a plan view schematically showing a configuration on a front side of the vehicle 10 of the present embodiment. FIG. 3 is an electrical circuit diagram showing an electrical connection relation of the vehicle 10 of the present embodiment.

As shown in FIGS. 1 to 3, the vehicle 10 includes, in addition to the PCU 28, an engine 20 (see FIG. 2), a traction motor 22, a generator 24, a high voltage battery 26 (hereinafter also referred to as a "battery 26" or a "BAT 26"), a low voltage system 30, a first cable 32, a second cable 34, and a radiator 36. The vehicle 10 is a hybrid vehicle, and utilizes the engine 20 and the traction motor 22 as traveling drive sources. As will be discussed later, the vehicle 10 may be another type of vehicle. The generator 24 generates electric power on the basis of a driving force of the engine 20. The generator 24 may also be used as a traveling drive source.

The PCU 28 converts or adjusts the electric power from the battery 26 and/or the generator 24, and supplies the converted or adjusted electric power to the traction motor 22. Further, the PCU 28 converts or adjusts the generated electric power Pgen of the generator 24 and the generated electric power (regenerative power Preg) of the traction motor 22, and uses the converted or adjusted electric power to charge the battery 26.

[A-1-2. Traction Motor 22]

The traction motor 22 is a three-phase alternating current (AC) brushless type motor, and serves as a drive source for driving the vehicle 10, and which generates motive power Ftrc and supplies the motive power to the vehicle wheels 40 (driving wheels). More specifically, the traction motor 22 is driven by one or both of electric power Pbat from a high voltage battery 26 and electric power Pgen from the generator 24. Further, the traction motor 22 carries out regeneration during braking of the vehicle 10, and supplies regenerative electric power Preg to the battery 26. The regenerative electric power Preg may also be supplied to a low voltage system 30.

Hereinafter, the traction motor 22 may also be referred to as a TRC motor 22 or simply a motor 22. The TRC motor 22 may function as a generator in addition to or instead of functioning as a traction motor. Hereinafter, "TRC" or "trc" or "t" is appended to parameters related to the traction motor 22. Further, in FIGS. 1 and 3, the traction motor 22 is indicated by "TRC".

[A-1-3. Generator 24]

The generator 24 is a three-phase alternating current brushless type generator, and functions as a generator that generates electric power by the motive power Feng from the engine 20. The electric power Pgen generated by the generator 24 is supplied to the battery 26 or the traction motor 22, or is supplied to the low voltage system 30.

Hereinafter, the generator 24 may also be referred to as a GEN 24. The GEN 24, in addition to or instead of functioning as a generator, may also function as a traction motor. Hereinafter, "GEN" or "gen" or "g" is appended to parameters related to the generator 24. Further, in FIG. 3, the generator 24 is indicated by "GEN". The generator 24 can be used as a starter motor for the engine 20.

[A-1-4. High Voltage Battery 26]

The high voltage battery 26 is a power storage device (energy storage) including a plurality of battery cells, and is capable of outputting high voltage (several hundreds of volts). For example, a lithium ion secondary battery, a nickel hydrogen secondary battery, or the like, can be used for the high voltage battery 26. Instead of or in addition to the battery 26, it is also possible to use a power storage device such as a capacitor.

[A-1-5. PCU 28]

(A-1-5-1. Outline of PCU 28)

The PCU 28 converts or adjusts the electric power from the battery 26 and/or the generator 24, and supplies the converted or adjusted electric power to the traction motor 22. Further, the PCU 28 converts or adjusts the generated electric power Pgen of the generator 24 and the regenerative electric power Preg of the traction motor 22, and uses the converted or adjusted electric power to charge the battery 26.

As shown in FIG. 3, the PCU 28 includes a first DC/DC converter 50, a first inverter 52, a second inverter 54, a first capacitor 56, a second capacitor 58, an electronic control unit 60 (hereinafter referred to as an "ECU 60"), and a second DC/DC converter 62.

(A-1-5-2. First DC/DC Converter 50)

The first DC/DC converter 50 (hereinafter also referred to as a "converter 50") is a step-up/step-down type converter. The converter 50 steps up the output voltage Vbat (hereinafter also referred to as a "battery voltage Vbat") of the battery 26, and outputs the stepped-up voltage to the TRC motor 22. Further, the converter 50 steps down the output voltage Vgen of the generator 24 (hereinafter also referred to as a "GEN voltage Vgen") or the output voltage Vreg of the traction motor 22 (hereinafter also referred to as a "regenerative voltage Vreg"), and supplies the stepped-down voltage to the battery 26.

(A-1-5-3. First Inverter 52)

The first inverter 52 converts the DC current from the battery 26 into an AC current, and supplies the AC current to the traction motor 22. Further, the first inverter 52 converts the AC current from the traction motor 22 into a DC current, and supplies the DC current to the battery 26.

(A-1-5-4. Second Inverter 54)

The second inverter 54 converts the AC current from the generator 24 into a DC current, and supplies the DC current to the battery 26 and/or the traction motor 22. Further, in the case that the generator 24 is used as a traveling drive source, the second inverter 54 converts the DC current from the battery 26 into an AC current, and supplies the AC current to the generator 24.

(A-1-5-5. First Capacitor 56 and Second Capacitor 58)

The first capacitor 56 and the second capacitor 58 function as smoothing capacitors.

(A-1-5-6. Second DC/DC Converter 62)

The second DC/DC converter 62 steps down the battery voltage Vbat or the like, and outputs the stepped-down voltage to the low voltage system 30 (in particular, a relay box 90).

(A-1-5-7. ECU 60)

The ECU 60 is a control circuit (or a control device) that controls the respective components of the PCU 28, and has an input/output unit, a computation unit, and a storage unit, none of which are shown. The input/output unit inputs signals to and outputs signals from the respective components of the vehicle 10 via signal lines 70 (communication lines). It should be noted that, in FIG. 1, the signal lines 70 are shown in a simplified manner. The input/output unit includes a non-illustrated A/D conversion circuit for converting input analog signals into digital signals.

The computation unit includes a central processing unit (CPU), and operates by executing programs stored in the storage unit. A portion of the functions executed by the computation unit can also be realized through the use of logic ICs (Integrated Circuits). The programs may be supplied from the exterior via a non-illustrated wireless communications device (a mobile phone, a smartphone, or the like). In the computation unit, a portion of the programs can also be constituted by hardware (circuit components).

The storage unit stores programs and data used by the computation unit, and is equipped with a random access memory (hereinafter referred to as a "RAM"). As the RAM, there can be used a volatile memory such as a register or the like, and a nonvolatile memory such as a flash memory or the like. Further, in addition to the RAM, the storage unit may include a read only memory (hereinafter referred to as a "ROM").

[A-1-6. Low Voltage System 30]

The low voltage system 30 is a power system that handles low voltage (for example, 12 V). As shown in FIG. 3, the low voltage system 30 includes a relay box 90, a low voltage battery 92, and electrical accessories 94a, 94b (hereinafter also referred to as "auxiliary devices 94a, 94b" and collectively as "auxiliary devices 94"). Moreover, although only two auxiliary devices 94 (94a, 94b) are shown in FIG. 3, the number of auxiliary devices 94 may be one or three or more.

The relay box 90 switches the connection relation (on/off) on the basis of commands from the ECU 60 or another ECU of the vehicle 10. It should be noted that, in FIG. 3, illustration of the signal lines 70 connecting the ECU 60 and the relay box 90 is omitted. The low voltage battery 92 (hereinafter also referred to as a "12 V battery 92") supplies low voltage (for example, 12 V) power to the low voltage system 30. The low voltage battery 92, for example, is a lead battery. The auxiliary devices 94a, 94b are devices that operate at low voltage. As examples of the auxiliary devices 94a, 94b, there are included, for example, a navigation device and a headlight (neither of which is shown), the ECU 60, and the like.

[A-1-7. First Cable 32 and Second Cable 34]

As shown in FIG. 3, the first cable 32 is an electric power line connecting the PCU 28 (in particular, a secondary side of the second DC/DC converter 62) and the low voltage system 30 (in particular, the relay box 90). The first cable 32 includes two core wires and a cover that covers the core wires (neither of which is shown). The first cable 32 includes a connector 100a on the side of the PCU 28 (hereinafter also referred to as a "first PCU side connector 100a"), and a connector 100b on the side of the low voltage system 30 (hereinafter also referred to as a "low voltage system side connector 100b").

The first PCU side connector 100a is connected to a connector 110 (hereinafter also referred to as a "first PCU connector 110") of the PCU 28. The low voltage system side connector 100b is connected to a connector 112 (hereinafter also referred to as a "low voltage system connector 112") of the low voltage system 30 (in particular, the relay box 90).

The second cable 34 is an electric power line connecting the high voltage battery 26 and the PCU 28 (in particular, a primary side of the first DC/DC converter 50). The second cable 34 includes two core wires and a cover that covers the core wires (neither of which is shown). The second cable 34 includes a connector 120a on the side of the PCU 28 (hereinafter also referred to as a "second PCU side connector 120a"), and a connector 120b on the side of the battery 26 (hereinafter also referred to as a "battery side connector 120b"). The second PCU side connector 120a is connected to a connector 130 (hereinafter also referred to as a "second PCU connector 130") of the PCU 28. The battery side connector 120b is connected to a connector 132 (hereinafter also referred to as a "battery connector 132") of the battery 26.

Moreover, although not shown in FIG. 3, other connections (for example, a connection between the PCU 28 and the motor 22, a connection between the PCU 28 and the generator 24) can also be made using similar cables, bus bars, or the like.

[A-1-8. Radiator 36]

The radiator 36 is a component that cools the coolant (not shown) that serves to cool the PCU 28, etc., and is disposed on a distal end side of the vehicle 10. The radiator 36 is a front side peripheral component which is located more on the front side than the PCU 28.

A-2. Arrangement of Respective Components

As shown in FIGS. 1 and 2, the engine 20, the motor 22, the generator 24, the PCU 28, the 12-V battery 92, and the relay box 90 are disposed in a front side room 150. The front side room 150 functions as an engine room for the engine 20, a motor room for the motor 22, and a generator room for the generator 24.

As shown in FIG. 1, the front side room 150 is disposed between a vehicle cabin 152, a bonnet 154, and a front side frame 156 (motor frame). The front side frame 156 is connected to a non-illustrated main frame.

As shown in FIG. 1 (and in FIG. 5, to be described later), the PCU 28 is fixed to a motor housing 160 in which the motor 22 is accommodated. Further, the PCU 28 is inclined so as to be positioned at a downward orientation heading toward the front side of the vehicle 10 (see FIG. 5). In addition to the motor 22, the motor housing 160 of the present embodiment also accommodates the generator 24.

As shown in FIG. 1, the high voltage battery 26 is disposed below a seat 170 or a floor 172 inside the vehicle cabin 152, and is supported by the main frame.

A-3. Specific Configuration and Arrangement of PCU 28

[A-3-1. Overview]

FIG. 4 is a perspective view schematically showing an external appearance of the PCU 28 of the present embodiment. FIG. 5 is a side view of the PCU 28 of the present embodiment and the periphery thereof. As shown in FIGS. 4 and 5, the PCU 28 includes an upper case 200, a lower case 202, and a heat sink 204. The upper case 200, the lower case 202, and the heat sink 204 are each made of metal (for example, made of aluminum).

In the interior of the upper case 200 and the lower case 202, circuit components 210 (see FIG. 4) are arranged, such as the first DC/DC converter 50, the first inverter 52, the second inverter 54, the first capacitor 56, the second capacitor 58, the ECU 60, and the second DC/DC converter 62. For example, in the upper case 200, the circuit components 210 are arranged on a circuit board 212 (see FIG. 4) and around the periphery thereof. A similar circuit board (not shown) is also provided in the lower case 202, and circuit components 210 are connected thereto.

Hereinafter, the circuit components 210 and the circuit board 212 are referred to collectively as a drive circuit 220. The drive circuit 220 supplies electric power to the motor 22. In addition, the drive circuit 220 supplies electric power from the generator 24 and the motor 22 to the battery 26 and the second DC/DC converter 62. The upper case 200 and the lower case 202 accommodate the drive circuit 220.

The heat sink 204 is a plate-shaped member that cools the first DC/DC converter 50, the first inverter 52, the second inverter 54, and the like, which act as heating elements. A coolant is supplied from a non-illustrated coolant pump to an introduction side pipe 230 (see FIG. 4) of the heat sink 204. After the coolant has moved inside the heat sink 204, the coolant is discharged from a discharge side pipe 232 (see FIG. 5). The coolant that is discharged from the discharge side pipe 232 releases heat through the radiator 36 (see FIGS. 1 and 2), and thereafter, the coolant is supplied again to the introduction side pipe 230.

As can be understood from FIGS. 4 and 5, the upper case 200, the lower case 202, and the heat sink 204 are connected or fixed to each other by screws 240.

Further, the upper case 200, the lower case 202, and the heat sink 204 (and more specifically, the PCU 28), which are connected or fixed by the screws 240, are further connected or fixed by bolts 250 to the motor housing 160. More specifically, a plurality of fastening bosses 252, in which the bolts 250 (fastening members) are arranged, are provided on the lower case 202. As can be understood from FIG. 4, etc., the fastening bosses 252 are provided at corner portions of the PCU 28 as viewed in plan.

As shown in FIGS. 4 and 5, according to the present embodiment, the lower case 202 and the heat sink 204 include a portion 260 (hereinafter referred to as a "front protruding portion 260") that extends in a forward direction of the upper case 200 in a longitudinal (front-rear) direction of the vehicle 10.

Further, as shown in FIGS. 4 and 5, the lower case 202 includes a portion 262 (hereinafter referred to as a "lateral protruding portion 262") that extends laterally beyond the upper case 200 and the heat sink 204. Details of the front protruding portion 260 and the lateral protruding portion 262 will be described later.

The upper case 200, the lower case 202, and the heat sink 204 are all arranged along the longitudinal direction of the vehicle 10. However, the upper case 200, the lower case 202, and the heat sink 204 are inclined so as to be positioned at a downward orientation heading toward the front side of the vehicle 10 (see FIG. 5).

[A-3-2. First PCU Connector 110]

As described above, the first PCU connector 110 (see FIG. 3) of the PCU 28 is electrically connected to the drive circuit 220 (in particular, to the secondary side of the second DC/DC converter 62). The first PCU connector 110 is a component having a terminal portion, and an insulating portion (or a protective portion for protecting the insulating portion from water or the like) which is made of resin or the like and supports the terminal portion. Further, the first PCU connector 110 is capable of inputting or outputting electric power with respect to the exterior of the PCU 28 (i.e., to the low voltage system 30, and in particular, the relay box 90) via the first cable 32.

As shown in FIGS. 4 and 5, the first PCU connector 110 is disposed on the front protruding portion 260. More specifically, the first PCU connector 110 is disposed on the front protruding portion 260 at a more rearward position than a front end of the front protruding portion 260 (see FIGS. 4 and 5). For fixing the first PCU connector 110 to the front protruding portion 260, for example, it is possible to form a flange (not shown) on the first PCU connector 110, and to use a method in which the flange and the front protruding portion 260 are fixed together by using screws.

As described above, the front protruding portion 260 is a portion that extends in a forward direction, ahead of (the front surface 270 of) the upper case 200, and is constituted by the lower case 202 and the heat sink 204. Stated otherwise, a portion of the wiring of the drive circuit 220 is routed inside the lower case 202 and the heat sink 204, and is connected to the first PCU connector 110.

As shown in FIG. 5, the front end of the front protruding portion 260 is positioned on a more rearward side than the front end of the motor housing 160 (see FIG. 5). In FIG. 5, an imaginary plane P is shown that contacts the front end (a forwardmost front side position) of the motor housing 160. The imaginary plane P is a plane that extends in the lateral (left-right) direction and the vertical (up-down) direction of the vehicle 10, and is perpendicular with respect to the longitudinal (front-rear) direction of the vehicle 10.

Further, as shown in FIGS. 4 and 5, the first PCU connector 110 is disposed adjacent to the bolt 250 and the fastening boss 252. Furthermore, as shown in FIGS. 4 and 5, the first PCU connector 110 is arranged in an upwardly facing manner. Therefore, by displacing in a downward direction the first PCU side connector 100a of the first cable 32, which is to be connected to the first PCU connector 110, both of the connectors 100a, 110 are connected together mutually.

[A-3-3. Second PCU Connector 130]

As described above, the second PCU connector 130 (see FIG. 3) of the PCU 28 is electrically connected to the drive circuit 220 (in particular, to the primary side of the first DC/DC converter 50). The second PCU connector 130 is a component having a terminal portion, and an insulating portion (or a protective portion for protecting the insulating portion from water or the like) which is made of resin or the like and supports the terminal portion. Further, the second PCU connector 130 is capable of inputting or outputting electric power with respect to the exterior of the PCU 28 (i.e., to the high voltage battery 26) via the second cable 34.

As shown in FIGS. 4 and 5, the second PCU connector 130 is disposed on the lateral protruding portion 262. As described above, the lateral protruding portion 262 is a portion that protrudes in a lateral direction beyond (the side surface 272 of) the upper case 200, and is constituted by the lower case 202. Stated otherwise, a portion of the wiring of the drive circuit 220 is routed inside the lower case 202, and is connected to the second PCU connector 130.

Further, as shown in FIGS. 4 and 5, the second PCU connector 130 is disposed adjacent to the bolt 250 and the fastening boss 252, on a rear side of the bolt 250 and the fastening boss 252. Furthermore, as shown in FIGS. 4 and 5, the second PCU connector 130 is arranged in an upwardly facing manner. Therefore, by displacing in a downward direction the second PCU side connector 120a of the second cable 34, which is to be connected to the second PCU connector 130, both of the connectors 120a, 130 are connected together mutually. Further still, as shown in FIGS. 4 and 5, the second PCU connector 130 is inclined in the rearward direction.

A-4. Assembly of PCU 28, Etc.

In the case of assembling the PCU 28, first, the upper case 200, the lower case 202, and the heat sink 204 are fastened together mutually with the screws 240, in a state in which the circuit components 210 (see FIG. 4) and the circuit board 212 are disposed inside the upper case 200 and the lower case 202 (see FIGS. 4 and 5). Thereafter, the upper case 200, the lower case 202, and the heat sink 204 (i.e., the PCU 28), which are connected to each other, are fixed to the motor housing 160 by the bolts 250 (see FIGS. 4 and 5).

A-5. Effects of the Present Embodiment

According to the present embodiment, the first PCU connector 110 (first terminal) is disposed in an upwardly facing manner (see FIGS. 4 and 5). Therefore, for example, in a state in which the bonnet 154 is opened, an operator can easily see the first PCU connector 110. In addition, the first PCU connector 110 is disposed on the front protruding portion 260 that is formed by extending a portion (in this instance, the front surface 270 of the upper case 200) of the front side surface of the PCU 28 (drive circuit unit) in a forward direction (see FIGS. 4 and 5). Therefore, for example, compared to a case in which the first PCU connector 110 is disposed behind or to one side of the PCU 28 (or the upper case 200), it is possible to shorten the distance between the operator and the first PCU connector 110. Accordingly, it is possible to improve ease of operation when attaching or detaching the first cable 32, at a time of assembling the vehicle 10 or when performing maintenance or the like.

Further, according to the present embodiment, the first PCU connector 110 is disposed on the front protruding portion 260 at a more rearward position than the front end of the front protruding portion 260 (see FIGS. 4 and 5). Therefore, in the case that a front side peripheral component (the radiator 36 or the like), which is arranged more on a front side than the PCU 28 (drive circuit unit), presses against the PCU 28 when the vehicle 10 collides with a forward obstacle, the pressing force (load) from the front side peripheral component is received by the front end of the front protruding portion 260. Accordingly, by preventing the load from being directly input to the first PCU connector 110, it is possible to protect the first PCU connector 110.

In the present embodiment, the PCU 28 (drive circuit unit) further comprises the upper case 200 (case) in which the drive circuit 220 is accommodated, and the heat sink 204 which is fixed to the upper case 200 and arranged along the longitudinal direction of the vehicle 10 (see FIGS. 4 and 5). Further, the front protruding portion 260 is configured as a portion of the heat sink 204 that is positioned in front of the upper case 200 (see FIGS. 4 and 5).

In accordance with these features, the first PCU connector 110 (first terminal) is disposed on the front protruding portion 260, which forms a portion of the heat sink 204 that is positioned in front of the upper case 200. Because the heat sink 204 is fixed to the upper case 200, it is easy to arrange the first PCU connector 110 in the vicinity of the upper case 200.

Further, in the case that the heat sink 204 is of relatively high rigidity, it is possible to protect the first PCU connector 110 more reliably, even when the vehicle 10 collides with a forward obstacle, and the front side peripheral component (the radiator 36 or the like) is pressed against the heat sink 204.

According to the present embodiment, the fastening boss 252 (fastening part), in which the bolt 250 (fastening member) is disposed for fastening the PCU 28 to the motor housing 160, is formed on the front protruding portion 260 (see FIGS. 4 and 5). Further, the first PCU connector 110 (first terminal) is disposed at a more rearward position than the front end of the front protruding portion 260 and to one side of the fastening boss 252 (see FIGS. 4 and 5).

Since the bolt 250, which is disposed in the fastening boss 252, is fixed to the motor housing 160, rigidity in the vicinity of the fastening boss 252 tends to be high. According to the present embodiment, the first PCU connector 110 is disposed at a more rearward position than the front end of the front protruding portion 260 and to one side of the bolt 250 and the fastening boss 252 (see FIGS. 4 and 5). Therefore, even in the case that the vehicle 10 collides with a forward obstacle and the front side peripheral component (the radiator 36 or the like) is pressed against the front protruding portion 260, it is possible for the first PCU connector 110 to be protected more reliably.

In the present embodiment, the PCU 28 (drive circuit unit) further comprises the second PCU connector 130 (second terminal) connected electrically to the drive circuit 220, and which is capable of inputting or outputting electric power with respect to the exterior of the PCU 28 via the second cable 34 (see FIGS. 4 and 5). Further, the fastening boss 252 is formed at an end of the front protruding portion 260 in a vehicle widthwise direction (see FIG. 4). Furthermore, the second PCU connector 130 is disposed in an upwardly facing manner on a rear side of the fastening boss 252 (fastening part) (see FIGS. 4 and 5).

As discussed above, the rigidity in the vicinity of the fastening boss 252 tends to be high. According to the present embodiment, the first PCU connector 110 and the second PCU connector 130 are provided in the vicinity of the fastening boss 252. Therefore, even in the case that the vehicle 10 collides with a forward obstacle and the front side peripheral component (the radiator 36 or the like) is pressed against the front protruding portion 260, it is possible for the first PCU connector 110 and the second PCU connector 130 to be protected more reliably.

Further, since the first PCU connector 110 and the second PCU connector 130 are disposed in the vicinity of the fastening boss 252 (fastening part), the first PCU connector 110 and the second PCU connector 130 are disposed in close proximity to each other. Therefore, in the case that attachment or detachment of the first cable 32 and the second cable 34 are carried out at the same time, operational efficiency can be improved.

Furthermore, for example, by laying out the first cable 32 and the second cable 34 collectively in a rearward direction, the first cable 32 and the second cable 34 are laid out in a manner that utilizes space efficiently, and it is possible to provide portions for absorbing vibrations of the traveling drive sources on the cables.

In the present embodiment, the PCU 28 (drive circuit unit) is fixed to the motor housing 160 in which the motor 22 is accommodated (see FIG. 5). The front end of the front protruding portion 260 is positioned on a more rearward side than the front end of the motor housing 160 (see FIG. 5).

In accordance with these features, in the case that the vehicle 10 collides with a forward obstacle and the front side peripheral component (the radiator 36 or the like) is displaced toward the rear, the front side peripheral component has a higher possibility of coming into contact with the front end of the motor housing 160 than the front end of the front protruding portion 260. Stated otherwise, contact of the front side peripheral component with respect to the first PCU connector 110 can be prevented both by the front protruding portion 260 and the motor housing 160. Accordingly, the first PCU connector 110 can be protected more reliably.

In the present embodiment, the drive circuit 220 includes the second DC/DC converter 62 (DC/DC converter) adapted to step down the voltage from the high voltage battery 26 (power source) (see FIGS. 1 to 3). The first cable 32 connects the output side of the second DC/DC converter 62 and the low voltage system 30 via the first PCU connector 110. The second cable 34 connects the second PCU connector 130 and the high voltage battery 26 to each other (see FIG. 3).

In accordance with these features, the first PCU connector 110 to which a relatively low voltage is applied is disposed on a front side, whereas the second PCU connector 130 to which a relatively high voltage is applied is disposed on a rear side. Accordingly, in the case that the vehicle 10 collides with a forward obstacle and the front side peripheral component (the radiator 36 or the like) comes into contact with the front protruding portion 260, the second PCU connector 130 can be protected preferentially over the first PCU connector 110.

In the present embodiment, the PCU 28 (drive circuit unit) is inclined so as to be positioned at a downward orientation heading toward the front side of the vehicle 10 (see FIG. 5). In accordance with this feature, it is possible to further improve ease of operation when the operator attaches or detaches the first cable 32 to or from the front side of the vehicle 10.

In the present embodiment, the motor 22 and the PCU 28 (drive circuit unit) are arranged inside the front side room 150 (motor room) provided on the front side of the vehicle 10 (see FIG. 1). The front side room 150 is arranged between the vehicle cabin 152, the bonnet 154, and the front side frame 156 (motor frame) (see FIG. 1). Consequently, it is possible to enhance the effect of the arrangement and orientation of the first PCU connector 110.

B. Modifications

It is a matter of course that the present invention is not limited to the above-described embodiment, and various modified or additional configurations could be adopted therein based on the descriptive content of the present specification. For example, the following configurations can be adopted.

B-1. Objects to which the Present Invention is Applied

The vehicle 10 of the above-described embodiment includes the engine 20, the traction motor 22, and the generator 24 (see FIG. 1). However, for example, insofar as attention is paid to the arrangement and orientation of the first PCU connector 110 (first terminal) or the second PCU connector 130 (second terminal), the present invention is not limited to this feature. For example, the vehicle 10 may be an electrically powered vehicle that does not include the engine 20. Alternatively, the vehicle 10 may be configured to include a plurality of traction motors 22 and generators 24.

B-2. Rotary Electric Machines

The traction motor 22 and the generator 24 of the above embodiment are three-phase AC brushless type rotary electric machines (see FIG. 3). However, for example, insofar as attention is paid to the arrangement and orientation of the first PCU connector 110 (first terminal) or the second PCU connector 130 (second terminal), the present invention is not limited to this feature. The traction motor 22 and the generator 24 may be of a direct current type or a brush type.

B-3. Power Source

In the above-described embodiment, the high voltage battery 26 is used as a power source for supplying electric power to the motor 22 via the PCU 28 (see FIGS. 1 to 3). However, for example, insofar as attention is paid to the arrangement and orientation of the first PCU connector 110 (first terminal) or the second PCU connector 130 (second terminal), the present invention is not limited to this feature. For example, it is possible to position the generator 24 as the main power source (to use the generator 24 as a so-called range extender).

B-4. PCU 28 (Drive Circuit Unit)

[B-4-1. Overall Configuration of PCU 28]

In the above-described embodiment, both the upper case 200 and the lower case 202 are provided (see FIGS. 4 and 5). However, for example, insofar as attention is paid to the arrangement and orientation of the first PCU connector 110 (first terminal) or the second PCU connector 130 (second terminal), the present invention is not limited to this feature. For example, one or three or more cases may be provided. Moreover, as a situation in which only one case is provided, there may be considered a situation in which the case is fixed directly to the motor housing 160 (i.e., in which the drive circuit 220 is disposed directly on the motor housing 160), or the like.

In the above-described embodiment, one heat sink 204 is provided through which a coolant is circulated (see FIG. 4). However, for example, insofar as attention is paid to the arrangement and orientation of the first PCU connector 110 (first terminal) or the second PCU connector 130 (second terminal), the present invention is not limited to this feature. For example, it is possible to omit the heat sink 204 or to provide a plurality of heat sinks 204.

[B-4-2. Drive Circuit 220]

In the above-described embodiment, the drive circuit 220 includes the first DC/DC converter 50, the first inverter 52, the second inverter 54, the first capacitor 56, the second capacitor 58, the ECU 60, and the second DC/DC converter 62 (see FIGS. 3 and 4). However, for example, from the standpoint of converting (or adjusting) the electric power from the high voltage battery 26 and supplying the converted (or adjusted) electric power to the traction motor 22, the present invention is not limited to this feature. For example, the first DC/DC converter 50 may be omitted from the drive circuit 220. Alternatively, the second inverter 54 may be omitted (in which case, the generator 24 may also be omitted) from the drive circuit 220. Alternatively, the first inverter 52 (and the first DC/DC converter 50) may be omitted, in the event that the traction motor 22 is a direct current type of motor. Moreover, in the case that the first DC/DC converter 50 and the first inverter 52 are omitted, then in the drive circuit 220, as a process for converting or adjusting the electric power from the high voltage battery 26, an on/off switch can be provided.

[B-4-3. First PCU Connector 110 (First Terminal) and Second PCU Connector 130 (Second Terminal)]

In the above-described embodiment, the PCU 28 is provided with the first PCU connector 110 (i.e., a component having a terminal portion and an insulating portion) as a connecting portion to which the first cable 32 is connected (see FIG. 3, etc.). However, for example, from the standpoint of connecting the drive circuit 220 to the first cable 32 (or alternatively, from the standpoint of providing the first terminal that connects with the first cable 32 on the PCU 28), the present invention is not limited to this feature.

For example, instead of the first PCU connector 110, a terminal block to which core wires of the first cable 32 are fixed by screws may be provided on a side of the PCU 28 (in this case, the first cable 32 does not include the first PCU side connector 100a). Alternatively, instead of the first PCU connector 110, a bus bar may be provided, and such a bus bar may be connected to the first cable 32.

The same aspects may be applied to the second PCU connector 130.

[B-4-4. Front Protruding Portion 260 and Lateral Protruding Portion 262]

In the above-described embodiment, the front protruding portion 260 is formed by the lower case 202 and the heat sink 204 (see FIGS. 4 and 5). However, from the standpoint of the first PCU connector 110 (the first terminal) being disposed on a front side (of the front surface 270) of the upper case 200, the present invention is not limited to this feature.

For example, the front protruding portion 260 may be formed from only one of the lower case 202 or the heat sink 204. Alternatively, the front protruding portion 260 can be formed by a member that differs from any one of the upper case 200, the lower case 202, and the heat sink 204.

Alternatively, from the standpoint of the front protruding portion 260 being formed by extending a portion of the front side surface (in this case, the front surface 270) of the PCU 28 in a forward direction, in addition to or instead of the lower case 202 and the heat sink 204, a portion of the front surface 270 of the upper case 200 may protrude in a forward direction to thereby form the front protruding portion 260.

In the above-described embodiment, the lateral protruding portion 262 is formed by the lower case 202 (see FIGS. 4 and 5). However, from the standpoint of the second PCU connector 130 (second terminal) being disposed laterally (of the side surface 272) of the upper case 200, the present invention is not limited to this feature.

For example, the lateral protruding portion 262 may be formed by both the lower case 202 and the heat sink 204. Alternatively, the lateral protruding portion 262 can be formed by a member that differs from any one of the upper case 200, the lower case 202, and the heat sink 204.

B-5. Front Peripheral Component

In the above-described embodiment, the radiator 36 (FIGS. 1 and 2) is cited as an example of the front peripheral component in relation to the PCU 28. However, other components may be positioned as front peripheral components. As an example of another front peripheral component, for example, the 12-V battery 92 (see FIGS. 1 and 2) may be cited.

What is claimed is:

1. A vehicle comprising:
a motor;
a power source; and
a drive circuit unit configured to convert electric power from the power source and supply the converted electric power to the motor;
the drive circuit unit including:
a drive circuit configured to perform power conversion;
a first terminal electrically connected to the drive circuit, and which is configured to input or output electric power with respect to an exterior of the drive circuit unit via a first cable; and
a front protruding portion formed by extending a portion of a front side surface of the drive circuit unit in a forward direction in a longitudinal direction of the vehicle;
wherein the first terminal is disposed on the front protruding portion in an upwardly facing manner, at a more rearward position than a front end of the front protruding portion.

2. The vehicle according to claim 1, wherein the drive circuit unit further includes:
a case in which the drive circuit is accommodated; and
a heat sink fixed to the case, and arranged along the longitudinal direction of the vehicle; and
wherein the front protruding portion is configured as a portion of the heat sink, the portion thereof being positioned in front of the case.

3. The vehicle according to claim 1, wherein:
a fastening part, in which a fastening member is disposed, is formed on the front protruding portion, the fastening member being configured to fasten the drive circuit unit to a motor housing; and
the first terminal is disposed at a more rearward position than the front end of the front protruding portion and to one side of the fastening part.

4. The vehicle according to claim 3, wherein:
the drive circuit unit further includes a second terminal connected electrically to the drive circuit, and which is configured to input or output electric power with respect to an exterior of the drive circuit unit via a second cable;
the fastening part is formed at an end of the front protruding portion in a vehicle widthwise direction; and
the second terminal is disposed in an upwardly facing manner on a rear side of the fastening part.

5. The vehicle according to claim 1, wherein:
the drive circuit unit is fixed to a motor housing in which the motor is accommodated; and
the front end of the front protruding portion is positioned on a more rearward side than a front end of the motor housing.

6. The vehicle according to claim 4, wherein:
the drive circuit includes a DC/DC converter configured to step down a voltage from the power source;
the first cable connects an output side of the DC/DC converter to a low voltage system via the first terminal; and
the second cable connects the second terminal and the power source to each other.

7. The vehicle according to claim 1, wherein the drive circuit unit is inclined so as to be positioned at a downward orientation heading toward a front side of the vehicle.

8. The vehicle according to claim 1, wherein:
the motor and the drive circuit unit are arranged inside a motor room provided on a front side of the vehicle; and the motor room is arranged between a vehicle cabin, a bonnet, and a motor frame.

9. A drive circuit unit configured to convert electric power from a power source and supply the converted electric power to a motor, the drive circuit unit comprising:
- a drive circuit configured to perform power conversion;
- a first terminal electrically connected to the drive circuit, and which is configured to input or output electric power with respect to an exterior of the drive circuit unit via a first cable; and
- a front protruding portion formed by extending a portion of a front side surface of the drive circuit unit in a forward direction along a front-rear direction of a vehicle equipped with drive circuit unit;
- wherein the first terminal is disposed on the front protruding portion in an upwardly facing manner, at a more rearward position than a front end of the front protruding portion.

* * * * *